United States Patent
Pineau et al.

(10) Patent No.: US 9,361,775 B2
(45) Date of Patent: Jun. 7, 2016

(54) MOBILE TERMINAL SECURITY SYSTEMS

(71) Applicants: Richard Pineau, North Andover, MA (US); Adam Pineau, Haverhill, MA (US)

(72) Inventors: Richard Pineau, North Andover, MA (US); Adam Pineau, Haverhill, MA (US)

(73) Assignee: Oncam Global, Inc., Lowell, MA (US)

( * ) Notice: Subject to any disclaimer, the term of this patent is extended or adjusted under 35 U.S.C. 154(b) by 290 days.

(21) Appl. No.: 14/036,492

(22) Filed: Sep. 25, 2013

(65) Prior Publication Data

US 2015/0085128 A1 Mar. 26, 2015

(51) Int. Cl.
*G08B 13/196* (2006.01)
*H04N 7/18* (2006.01)

(52) U.S. Cl.
CPC .... *G08B 13/19608* (2013.01); *G08B 13/19645* (2013.01); *H04N 7/181* (2013.01)

(58) Field of Classification Search
CPC ............ G08B 13/2402; G08B 13/19608; G08B 13/19645; G07B 3/003; B08B 15/001; H04N 7/181
USPC ........................................................ 348/150
See application file for complete search history.

(56) References Cited

U.S. PATENT DOCUMENTS

| | | | |
|---|---|---|---|
| 6,690,374 B2 | 2/2004 | Park et al. | |
| 7,965,313 B2 | 6/2011 | Orias | |
| 8,096,466 B2 * | 1/2012 | Silverbrook | G06Q 10/087 235/379 |
| 8,195,576 B1 * | 6/2012 | Grigg | G06Q 20/20 380/229 |
| 8,261,327 B2 * | 9/2012 | Keeler et al. | 726/4 |
| 8,826,397 B2 * | 9/2014 | Sheets et al. | 726/6 |
| 8,893,252 B1 * | 11/2014 | Bharghavan et al. | 726/11 |
| 2002/0196330 A1 * | 12/2002 | Park | G08B 13/19608 348/49 |
| 2009/0099961 A1 * | 4/2009 | Ogilvy | G06Q 20/10 705/39 |
| 2010/0030578 A1 * | 2/2010 | Siddique et al. | 705/3 |
| 2013/0166332 A1 * | 6/2013 | Hammad | G07B 13/00 705/5 |
| 2013/0215116 A1 * | 8/2013 | Siddique et al. | 345/420 |
| 2014/0129452 A1 * | 5/2014 | Fordyce, III et al. | G06Q 30/014 705/303 |
| 2014/0162598 A1 * | 6/2014 | Villa-Real | 455/411 |

FOREIGN PATENT DOCUMENTS

| | | | | |
|---|---|---|---|---|
| HU | WO 2004034347 A1 * | 4/2004 | ....... | G08B 13/19608 |
| WO | 2004/034347 A1 | 4/2004 | | |
| WO | WO 2004034347 A1 * | 4/2004 | ............ | G08B 13/24 |

OTHER PUBLICATIONS

International Search Report and Written Opinion for PCT/US2014/052499 dated Jan. 5, 2015.
Cohen, I. et al. Associating Moving Objects Across Non-overlapping Cameras: A Query-by-Example Approach. 2008 IEEE Conference on Technologies for Homeland Security, May 12-13, 2008, pp. 566-571.
Johnsen, S. et al. Real-Time Object Tracking and Classification Using a Static Camera. Proceedings of the IEEE ICRA 2009 Workshop on People Detection and Tracking, May 2009.

(Continued)

*Primary Examiner* — Shan Elahi
(74) *Attorney, Agent, or Firm* — Burns & Levinson LLP; Orlando Lopez

(57) ABSTRACT

Systems that can track an object as it moves across the field of view of the security device, integrate transaction data with the object information, and can identify events that trigger an alert and methods for using the systems.

12 Claims, 5 Drawing Sheets

(56) References Cited

OTHER PUBLICATIONS

Kang, J. et al. Continuous Tracking Within and Across Camera Streams. Proceedings of the 2003 IEEE Computer Society Conference on Computer Vision and Pattern Recognition (vol. 1), Jun. 18-20, 2003, pp. I-267-I-272.

Khan, S. et al. Consistent Labeling of Tracked Objects in Multiple Cameras with Overlapping Fields of View. IEEE Transactions on Pattern Analysis and Machine Intelligence (vol. 25, Issue: 10) Oct. 2003, pp. 1355-1360.

Sheikh, Y. et al. Object Tracking Across Multiple Independently Moving Airborne Cameras. Tenth IEEE International Conference on Computer Vision, 2005. (vol. 2) Oct. 17-21, 2005, pp. 1555-1560.

* cited by examiner

MOBILE TERMINAL SECURITY SYSTEMS

BACKGROUND

This invention relates generally to security systems and methods for using security systems, and, more particularly, to security systems tracking objects across cameras in environments including mobile POS components.

A number of systems, using a number of cameras, enable identifying an object and following the object as it moves from one camera to another camera. Such systems find applications in airport security and similar situations.

In retail environments, the point of sale (POS) area is typically strongly monitored and movement in and out of that area is tracked. Recent developments have given rise to Mobile POS components where transactions occurred at any point in the environment. A customer can make multiple mobile PUS transactions and stop at multiple points in the environment. The mobile environment can give rise to situations where alert should be triggered.

The other similar environments having the same needs.

There is a need for systems that can track an object as it moves across the field of view of the security device, integrate transaction data with the object information, and can identify events that trigger an alert.

BRIEF SUMMARY

Systems that can track an object as it moves across the field of view of the security device, integrate transaction data with the object information, and can identify events that trigger an alert and methods for using the systems are disclosed herein below.

In one or more embodiments, the method of these teachings includes acquiring and recording an image of an object from one camera of a number of security cameras; each camera from the number of security cameras having position information and calibrated to identify other cameras from the number of security cameras in the vicinity of the each camera, providing the object with an identifier if the object meets predetermined criteria; the identifier provided to the object being a characteristic of the object, linking the object with transaction data from a mobile transaction component (also referred to as a mobile POS component), tracking the object from the one camera to another camera in the vicinity of the one camera as the object moves, providing video data for the object and the transaction data link to the object to a server; the video data for the object and the transaction data link to the object being stored at a database, utilizing the server to determine whether an event requiring an alert has occurred and utilizing the server to manage alerts.

In one instance, the predetermined criteria includes completing a transaction at the mobile POS component.

In one or more instances, the label is used in tracking the object from the one camera to the other camera; the label and the object constituting a labeled object.

In one or more embodiments, the system of these teachings includes a number of security cameras; each camera from the number of security cameras having position information and calibrated to identify other cameras from the number of security cameras in the vicinity of each camera; an image of an object being acquired and recorded by one security camera from the number of security cameras, a server, a database, the database having information for logic methods, one or more processors, and one or more computer usable media having computer readable code embodied therein; the computer readable code, when executed in the one or more processors, causes the one or more processors to receive the image of the object, provide the object with an identifier if the object meets predetermined criteria; the identifier provided to the object being a characteristic of the object, link the object with transaction data from a mobile POS component, and provide video data for the object and the transaction data link to the object to the server. This server includes one or more other processors and one or more other computer usable medium that has computer readable code embodied therein, which, when executed by the one or more other processors, causes the one or more other processors to receive the video data for the object and the transaction data link to the object, store the video data for the object and the transaction data link to the object in the database, determine, using the logic methods, whether an event requiring an alert has occurred and manage alerts.

For a better understanding of the present teachings, together with other and further objects thereof, reference is made to the accompanying drawings and detailed description and its scope will be pointed out in the appended claims.

DETAILED DESCRIPTION

Figure 1:
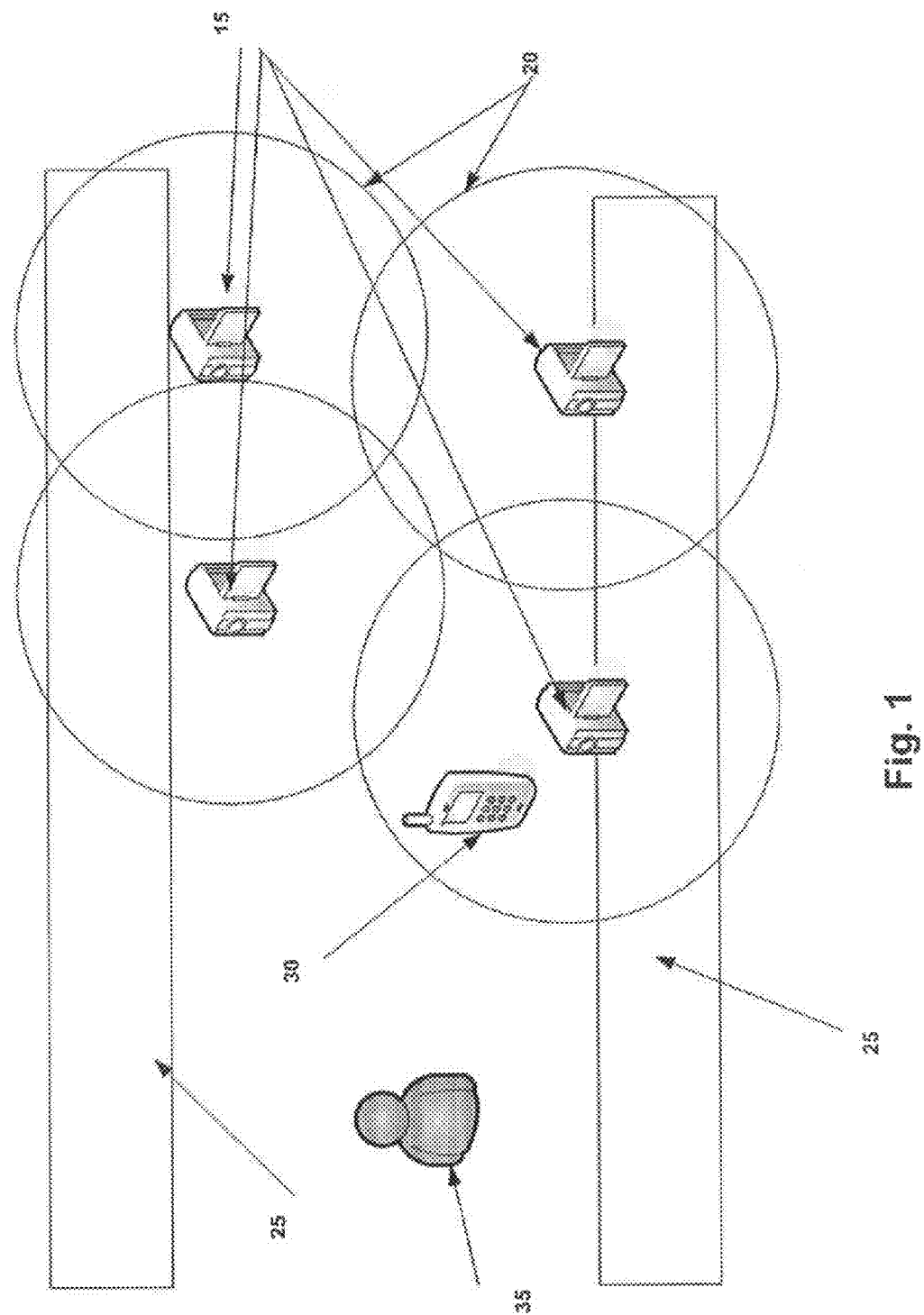
FIG. 1 is a schematic representation of components of one embodiment of the system of these teachings.

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

In one or more embodiments, the system of these teachings includes a number of security cameras; each camera from the number of security cameras having position information and calibrated to identify other cameras from the number of security cameras in the vicinity of each camera; an image of an object being acquired and recorded by one security camera from the number of security cameras, a server, a database, the database having information for logic methods (computer readable code for the logic methods being stored in the database), one or more processors, and one or more computer usable media having computer readable code embodied therein; the computer readable code, when executed in the one or more processors, causes the one or more processors to receive the image of the object, provide the object with an identifier if the object meets predetermined criteria; the identifier provided to the object being a characteristic of the object, link the object with transaction data from a mobile transaction component (also referred to as a mobile point-of-sale (POS) component), and provide video data for the object and the transaction data link to the object to the server. This server includes one or more other processors and one or more other computer usable medium that has computer readable code embodied therein, which, when executed by the one or more other processors, causes the one or more other processors to receive the video data for the object and the transaction data link to the object, store the video data for the object and the transaction data link to the object in the database, determine, using the logic methods, whether an event requiring an alert has occurred and manage alerts.

In one instance, the identifier provides a label for the object, where the label is used in tracking the object from the one camera to the other camera. The label and a object constitute a labeled object. In another instance, the predetermined criteria includes completing a transaction at the mobile POS component.

In a further instance, when the field of view (FOV) of each one camera overlaps the field of view of one or more other cameras, after the object is initially acquired, labeled and tracked by one of the cameras, tracking of the labeled object is handed from the one camera to the other, when the labeled object moves into the field of view of the other camera.

In one or more embodiments, in managing alerts, the computer readable code in the other computer usable medium at the server, causes, when executed in the one or more other processors, the one or more other processors to determine, using the logic methods stored in the database, whether an alert has occurred, determine, using the logic methods, a type of alert, merge an identifying ID with the alert type, determining a location of the alert and transmit the merged ID and the alert type and location to a predetermined site.

A component of one embodiment of the system of the present teachings is shown in FIG. 1. Referring to FIG. 1, in the embodiment shown therein, an object (a customer) 35 is moving along two structures 25 (such as displays, shelves, etc.) a number of cameras 15 are disposed above the object 35 and the structures 25. Each camera has a field of view (FOV) 20 in the embodiment shown there fields of view 20 are overlapping. Each camera has position information as to the position of the camera and is calibrated to identify other cameras in the vicinity, in one instance, the calibration identifies the cameras in the vicinity that have overlapping fields of view. A mobile transaction terminal 30 is disposed in the aisle between the two structures 25.

In one exemplary embodiment, typical of many retail environments, the two structures are shelves containing merchandise, the mobile transaction terminal 30 is a mobile POS terminal and the object 35 is a consumer. As a consumer moves along the aisle, an image of the consumer 35 is acquired by at least one of the cameras 15. As the consumer stops, makes a transaction (such as a purchase) at the mobile PUS terminal 30, the image of the consumer is provided with an identifier (label) which becomes a characteristic of the image of that object (consumer). As a consumer moves from the field of view of one camera to the field of view of another camera, the image of the consumer is tracked and the image of the object is linked with transaction data from the mobile POS terminal 30. Video data for the consumer and the transaction data link to the consumer is provided to a server. At this server, it is determining whether the event, the trajectory of the consumer after the transaction at the mobile POS term, requires an alert. An Exemplary embodiment of a possible situation that may require an alert is a consumer stopping at locations with similar products as that involved in the mobile POS transaction and selecting one similar product.

Figure 2:
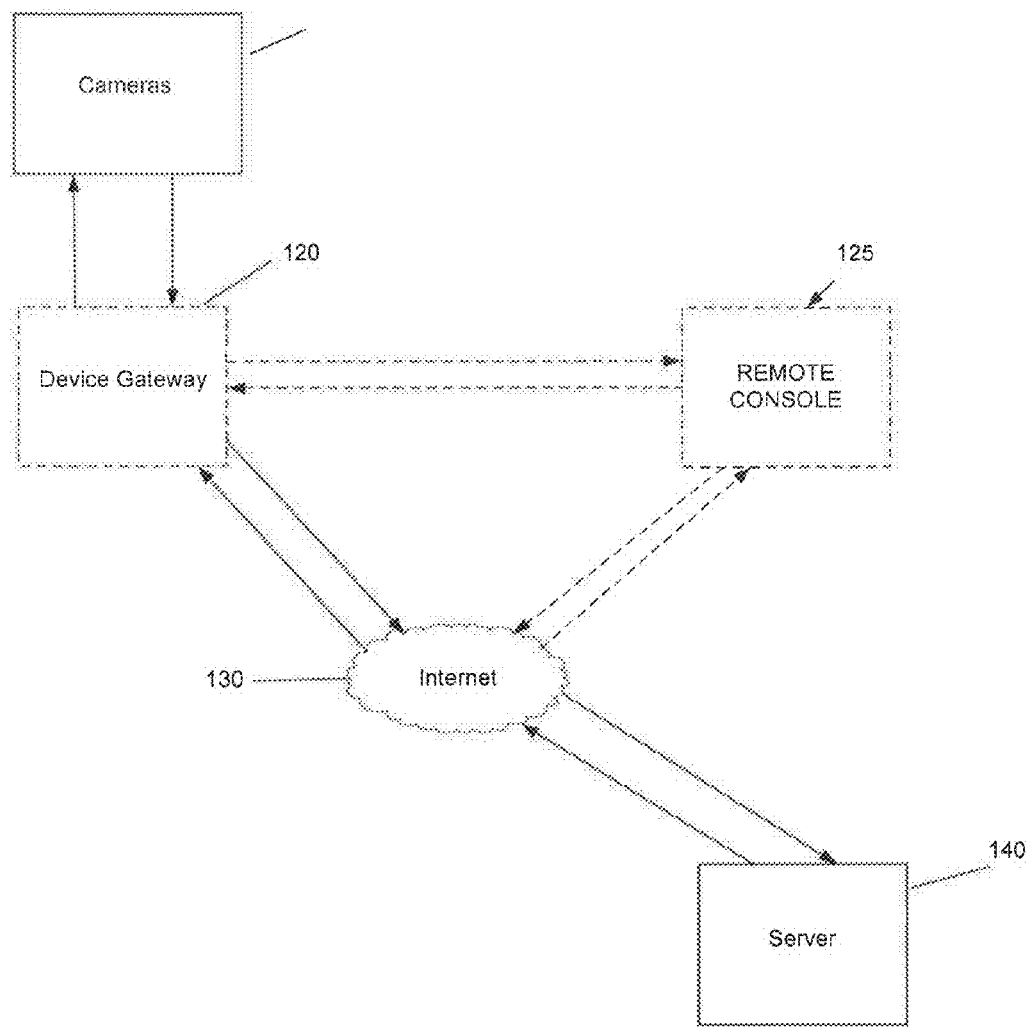
FIG. 2 is a chart that shows the key components and their relationship with other components in the present teachings.

FIG. 2 shows an embodiment of the system of the present teachings. Referring to FIG. 2, in the embodiment shown therein, the components shown in FIG. 1, referred to as image acquisition devices (cameras), 110 provide data through a communication network 130, labeled as an Internet (although any communication network including local area communication networks could be used), to a server 140. In the embodiment shown in FIG. 1, a device Gateway 120 and a remote console 125 are shown as optional (dotted) components. In one instance, some of the functions could be performed at the remote console 125 while, in another instance, all of the functions can be performed at the server 140. The term image acquisition devices, as used above, includes the mobile transaction terminal. The mobile terminal aspects of the system of these teachings are included in the component labeled image acquisition devices 110 and in the application that the server is adapted to perform (being adapted by having computer usable media having computer readable code embodied therein that when executed by a processors causes the server to perform the functions). (Without the mobile terminal aspects, the system of FIG. 2 has the same appearance as a Web based security system such as that disclosed in U.S. Pat. No. 8,508,355, which is incorporated by reference herein in its entirety and for all purposes.)

In one or more embodiments, the method of these teachings includes acquiring and recording an image of an object from one camera of a number of security cameras; each camera from the number of security cameras having position information and calibrated to identify other cameras from the number of security cameras in the vicinity of the each camera, providing the object with an identifier if the object meets predetermined criteria; the identifier provided to the object being a characteristic of the object, linking the object with transaction data from a mobile transaction component (also referred to as a mobile POS component), tracking the object from the one camera to another camera in the vicinity of the one camera as the object moves, providing video data for the object and the transaction data link to the object to a server; the video data for the object and the transaction data link to the object being stored at a database, utilizing the server to determine whether an event requiring an alert has occurred and utilizing the server to manage alerts.

In one instance, the predetermined criteria includes completing a transaction at the mobile POS component.

In another instance, the mobile POS component receive location data from a location providing system (for example, but not limited to, GPS). The location data for the mobile POS component is also linked to the object through linking to the image of the object.

In one or more instances, the label is used in tracking the object from the one camera to the other camera; the label and the object constituting a labeled object.

In a further instance, when the field of view (FOV) of each one camera overlaps the field of view of one or more other cameras, the field of view of the one camera, tracking of the labeled object is handed from the one camera to the other, when the labeled object moves into the field of view of the other camera.

In one instance, the server 140 (or the remote console 125) includes a detected region labeling component (or computer readable code to implement that function). The detected region labeling component could be, for example, a component as described in Multiscale Conditional Random Fields for Image Labeling, Proceedings of the 2004 IEEE Computer Society Conference on Computer Vision and Pattern Recognition, or in U.S. Pat. No. 7,024,020 B2, Apparatus and method for generating object-labeled image in video sequence, both of which are incorporated by reference herein in their entirety and for all purposes. After the detected region has been labeled, the detected region can be tracked during motion (see, for example, Real-Time Object Tracking and Classification Using a Static Camera, Proceedings of the IEEE ICRA 2009 Workshop on People Detection and Tracking Kobe, Japan, May 2009, Section 14.6, Motion Tracking, in chapter 14, Machine Vision Book available at http://www.cse.usf.edu/~rlk/MachineVisionBook/MachineVision-.files/MachineVision_Chapter 14.pdf, both of which are incorporated by reference herein in their entirety and for all purposes). The detected region can also be tracked during motion using the methods described in unman Kang, Isaac Cohen and Gerard Medioni, Continuous Tracking Within and Across Camera Streams, Proceedings of the 2003 IEEE Computer Society Conference on Computer Vision and Pattern Recognition (CVPR '03) and in Isaac Cohen, Yunqian Ma, Ben Miller, Associating Moving Objects Across Non-overlapping Cameras: A Query-by-Example Approach, 2008 IEEE Conference on Technologies for Homeland Security, and in U.S. Pat. No. 6,690,374, all of which are incorporated by reference herein in their entirety and for all purposes.

Figure 4:
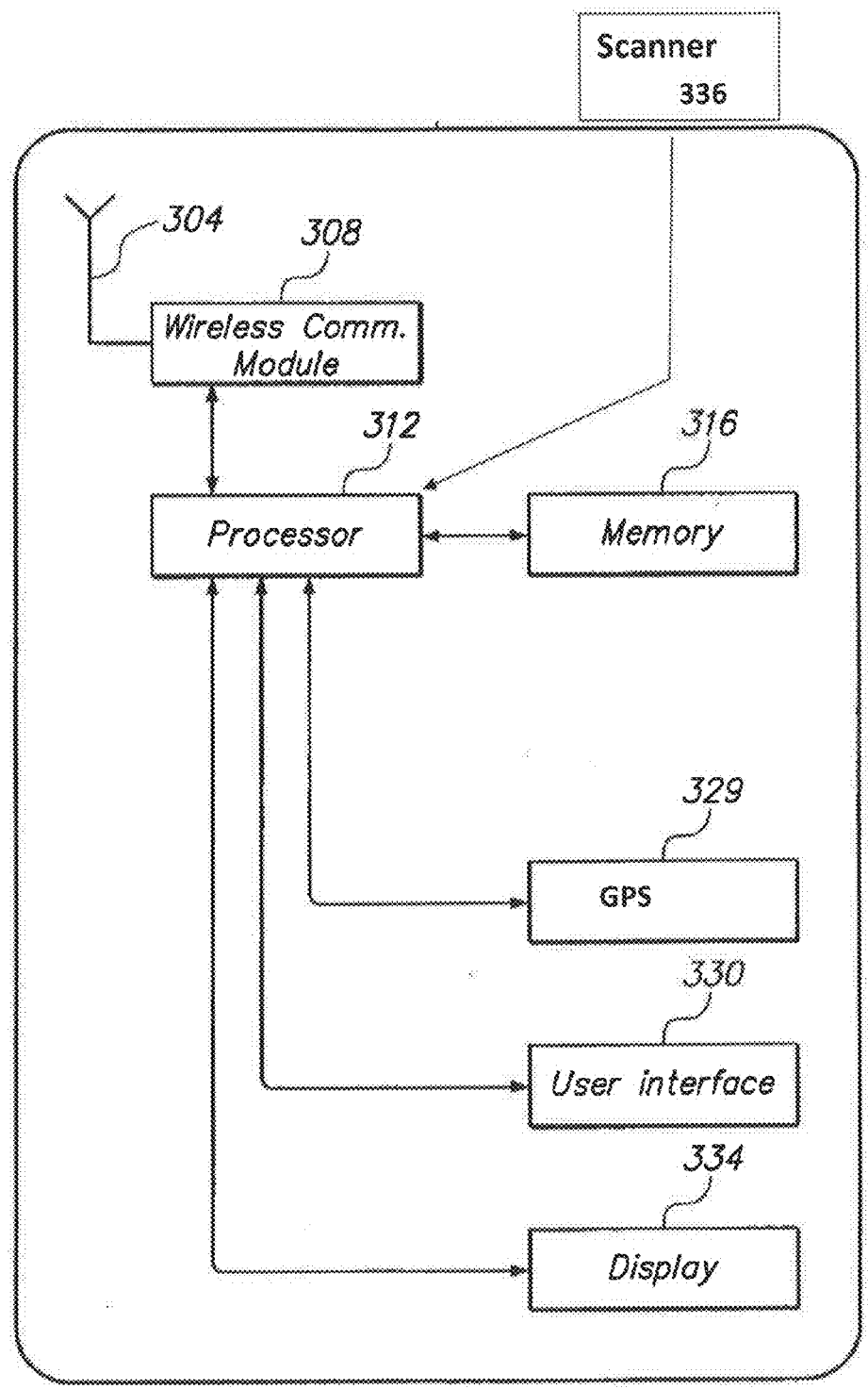
FIG. 4 represents a chart of the sub-components contained in the mobile transaction component as set forth in the present teachings.

FIG. 4 shows a block diagram of one exemplary embodiment of a mobile transaction (POS) component. It should be noted that other embodiments are also within the scope of these teachings. The mobile transaction (PUS) component shown in FIG. 4 includes an antenna 304 configured to send receive signals over a network. The antenna 304 is operatively connected to a communication module 308 that provides an interface between the antenna and the network and one or more processors 312. The one or more processors 312 are configured to execute machine readable code which is stored on computer readable media 316 (such as a memory, as shown), The one or more processors 312 are also configured to store computer readable code in the computer readable media 316. The mobile transaction (POS) component shown in FIG. 4 also has a display 334 configured to present information, such as portions of the one or more video data streams, to a user and a data acquisition device (such as a scanner and or camera) 336. The data acquisition device allows acquiring data for a transaction. A user interface 330 is configured to receive user input and the input to the one or more processors 312. In one instance, the user interface 330 is configured as part of the display 334, as, for example, in a touch screen display.

Figure 3:
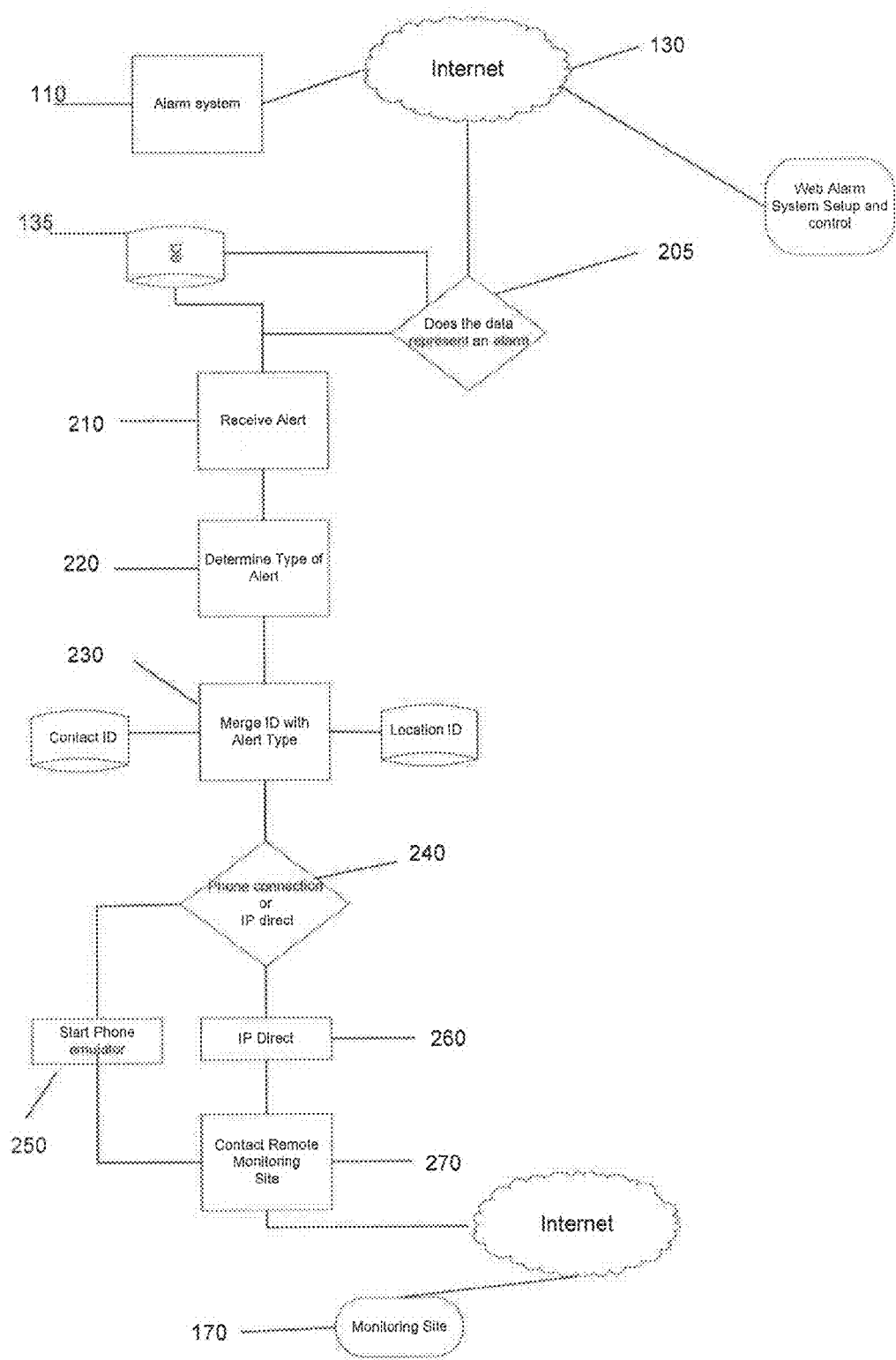
FIG. 3 is a chart that shows the device interaction between the components of FIG. 1 (also referred to as cameras or alarm system) and the server in the present teachings.

FIG. 3 outlines the various components and the corresponding pathways incorporated into the server 140. The server 140 provides for the determination of whether an alert is required, the determination the type of alert and the managing of alerts. Upon receiving the video data for the object (the image of the object) from the component in FIG. 1 (referred to as alarm system) 110, the object is provided with an identifier if the object meets predetermined criteria, is linked with the transaction data from the mobile POS component, and is tracked from one camera to another camera, functions which are performed by either the server 140 or the remote console 125. The video data (including the location data of each camera) and transaction data linked to the object are provided to the server 140 and whether the video data transaction data represent an alarm is determined 205. The determination is performed using the logic methods stored in the database 135.

If the signal represents an alarm alert (210, FIG. 3), there are three major steps: 1) determine the Alert Type (220, FIG. 3); 2) merge ID with Alert Type (230, FIG. 3); and 3) transmit the alert via an appropriate avenue to a Monitoring Site, a designated site or a combination of the above, or all of them at once. (270, FIG. 3). The logic stored in the database 135 is used to determine the type of alert, wherein the stored logic selects a user designated reaction to the type of alert. In one embodiment, once the alarm's nature is determined, it is then necessary to merge 230 the industry standard protocol with a Location ID database to determine which system or site is receiving the alert, Once the type of alert and the location of the alert are determined, it is then necessary to alert the Monitoring Site 170 (or a designated site, or all of them at once) via the Internet 130. Many Monitoring Sites utilize telephone lines to receive alerts and, as such, it might be necessary to utilize a Smart Phone Emulator 250 so the telephone signals can be passed via the Internet and be properly received by the Monitoring Site or other receiving site. If, however, the Monitoring Site (or other receiving site) can receive and interpret IP signals, the alert can also be transmitted directly 260 to the Monitoring Site 170 via the Internet.

In one exemplary embodiment of the stored logic, these teachings not being limited only to the exemplary embodiment, the user designated reaction is to review purchases at exit and the logic receives information on the location and time spent at location as the consumer's image is tracked over a number of cameras and also receives information on the transaction, and location of the transaction, at the mobile POS terminal, Based on the information the logic identifies whether an alert has occurred or not.

Figure 5:
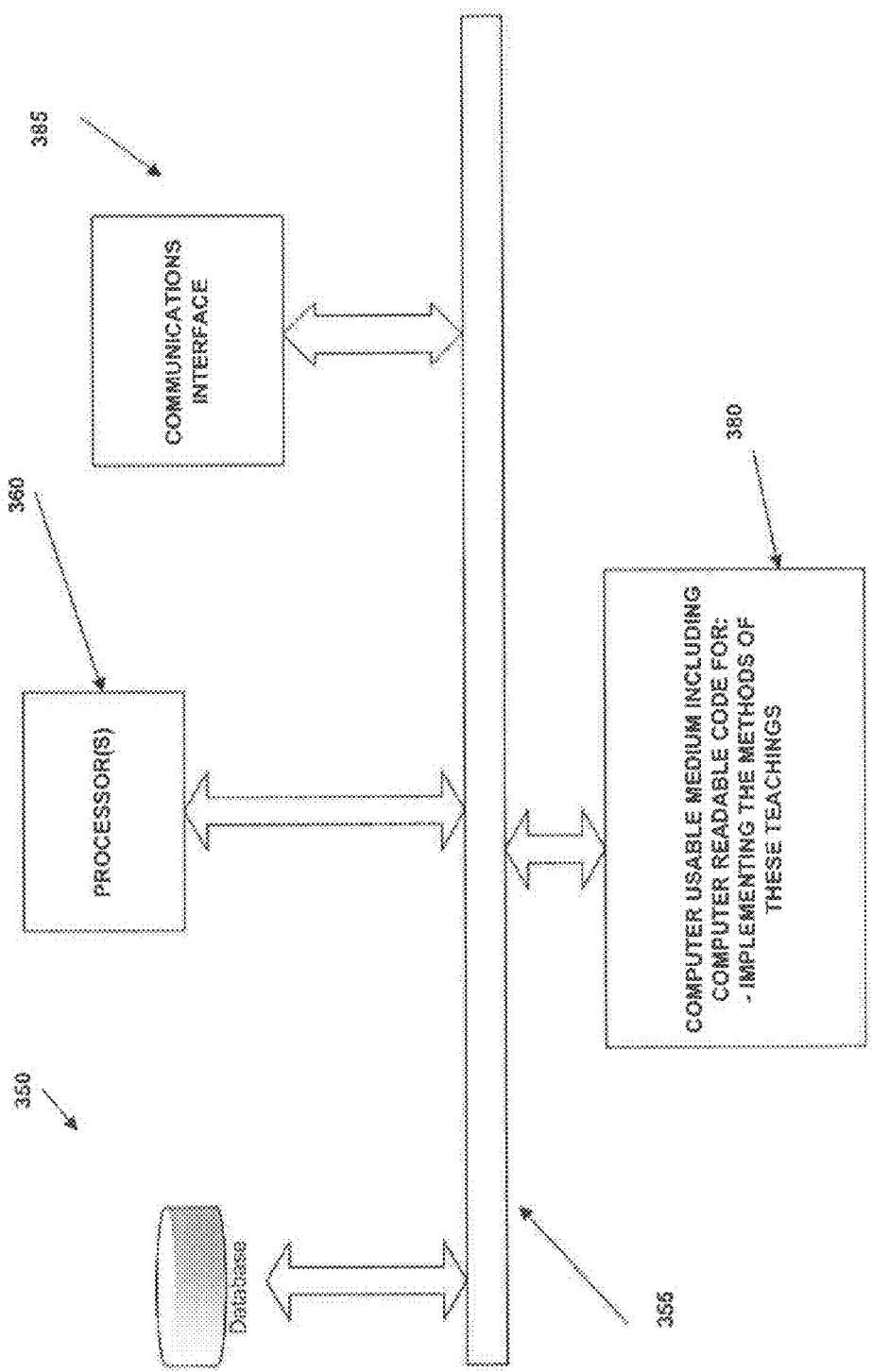
FIG. 5 is a block diagram representation of a portion of the server (or remote console) of these teachings.

In one embodiment, the server 140 of these teachings includes one or more processors (360, FIG. 5), one or more communication devices for communicating over a network (385, FIG. 5), one or more computer usable media having computer readable code embodied therein causing the one or more processors to perform the method of the present teachings (380, FIG. 5). In one instance, the server also includes another computer usable medium having the database 350 described hereinabove embodied therein, One embodiment of the general structure of the server 140 is shown in FIG. 5.

In embodiments in which the functionality is completely embodied in the server 140, the computer readable code embodied in the one or more computer usable media (380, FIG. 5), when executed by the one or more processors, causes the one or more processors to receive the image of the object, provide the object with an identifier if the object meets predetermined criteria; the identifier provided to the object being a characteristic of the object, link the object with transaction data from a mobile transaction component (also referred to as a mobile point-of-sale (POS) component), provide video data for the object and the transaction data link, receive the video data for the object and the transaction data link to the object, store the video data for the object and the transaction data link to the object in the database, determine, using the logic methods, whether an event requiring an alert has occurred and manage alerts.

In embodiments in which the remote console 125 is used, the general structure of the remote console 125 is the structure presented in FIG. 5 without the database 350. In those embodiments, the computer readable code embodied in the one or more computer usable media in the remote console 125, when executed by the one or more processors, causes the one or more processors to receive the image of the object, provide the object with an identifier if the object meets predetermined criteria; the identifier provided to the object being a characteristic of the object, link the object with transaction data from a mobile transaction component (also referred to as a mobile point-of-sale (POS) component), provide video data for the object and the transaction data link to the server. In those embodiments, the computer readable code embodied in the one or more computer usable media of the server, when executed by the one or more processors, causes the one or more processors to receive the video data for the object and the transaction data link to the object, store the video data for the object and the transaction data link to the object in the database, determine, using the logic methods, whether an event requiring an alert has occurred and manage alerts.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Elements and components described herein may be further divided into additional components or joined together to form fewer components for performing the same functions.

Each computer program may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, any physical medium with patterns of holes, a RAM, a PROM, and EPROM, a FLASH-EPROM, any other memory chip or cartridge, all of which are non-transitory. As stated in the USPTO 2005 Interim Guidelines for Examination of Patent Applications for Patent Subject Matter 1300 Off. Gaz. Pat. Office 142 (Nov. 22, 2005), "On the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal." Although the invention has been described with respect to various embodiments, it should be realized these teachings are also capable of a wide variety of further and other embodiments within the spirit and scope of the appended claims.

What is claimed is:

1. A method for operating a security system in an environment including mobile point-of-sale (POS) components, the method comprising:
   acquiring and recording an image of an object from one camera of a number of security cameras; each camera from the number of security cameras having position information and calibrated to identify other cameras from the number of security cameras in the vicinity of said each camera; calibration including field of view relations;
   providing the object with an identifier if the object meets predetermined criteria; the identifier provided to the object being a characteristic of the object;
   linking the object with transaction data from a mobile POS component;
   tracking the object from said one camera to another camera in the vicinity of said one camera as the object moves;
   providing video data for the object and the transaction data link to the object to a server;
   the video data for the object and the transaction data link to the object being stored at a database; and
   utilizing the server to determine whether an event requiring an alert has occurred; and
   utilizing the server to manage alerts;
   wherein the utilizing the server to manage alerts comprises:
      determining a type of alert for the alert using stored logic methods; wherein the stored logic methods select a user designated reaction;
      merging an identifying ID with the alert type;
      determining a location of the alert; and
      transmitting, using a transmitter and a preselected transmission method, the merged ID and alert type and the location to a predetermined site;
   wherein the server includes one or more processors and one or more non-transitory computer usable medium that has computer readable code embodied therein, which, when executed by the one or more processors, causes the one or more processors to receive the video data for the object and the transaction data link to the object, store the video data for the object and the transaction data link to the object in the database, determine, using the logic methods, whether an even requiring an alert has occurred and manage alerts.

2. The method of claim 1 wherein said identifier provides a label for the object; said label being used in tracking the object from said one camera to said another camera; said label and said object constituting a labeled object.

3. The method of claim 2 wherein a field of view (FOV) of each one camera from the number of cameras overlaps the fields of view of at least one other security camera from the number of security cameras; the field of view of said one camera overlapping the field of view of said another camera; and wherein tracking of the labeled object is handed from said one camera to said another camera when the label object moves into the field of view of said another camera.

4. The method of claim 1 wherein the predetermined criteria comprises completing a transaction at the mobile POS component.

5. The method of claim 1 wherein mobile POS components receive location data from a location providing system; wherein location data for said mobile POS component is also linked to the object.

6. A system comprising;
   a number of security cameras; each camera from the number of security cameras having position information and calibrated to identify other cameras from the number of security cameras in the vicinity of said each camera; calibration including field of view relations; an image of an object being acquired and recorded by one security camera from the number of security cameras;
   a server; the server being operatively connected to a network;
   one or more processors;
   one or more non-transitory computer usable media having computer readable code embodied therein; the computer readable code, when executed in the one or more processors, causes the one or more processors to:
receive the image of the object;
provide the object with an identifier if the object meets predetermined criteria; the identifier provided to the object being a characteristic of the object;
link the object with transaction data from a mobile POS component;
track the object from said one camera to another camera in the vicinity of said one camera as the object moves; and
provide video data for the object and the transaction data link to the object to the server;
a database, said database having information for logic methods;
the server comprising:
one or more other processors; and
one or more other non-transitory computer usable media having other computer readable code embodied therein; the other computer readable code, when executed in the one or more other processors, causes the one or more other processors to:
receive the video data for the object and the transaction data link to the object;
store the video data for the object and the transaction data link to the object in the database;
determine, using the logic methods, whether an event requiring an alert has occurred; and
manage alerts;
wherein, in managing alerts, said other computer readable code, when executed in the one or more other processors, causes the one or more other processors to:
determine a type of alert for an alert using the logic methods;
merge an identifying ID with the alert type;
determine a location of the alert; and
transmit, using a transmitter and a preselected transmission method, the merged ID and alert type and the location to a predetermined site.

7. The system of claim 6 wherein said identifier provides a label for the object; said label being used in tracking the object from said one camera to said another camera; said label and said object constituting a labeled object.

8. The system of claim 7 wherein a field of view (FOV) of each one camera from the number of security cameras overlaps the fields of view of at least one other camera from the number of security cameras; the field of view of said one camera overlapping the field of view of said another camera; and wherein tracking of the labeled object is handed from said one camera to said another camera when the label object moves into the field of view of said another camera.

9. The system of claim 6 wherein the predetermined criteria comprises completing a transaction at the mobile POS component.

10. The system of claim 6 wherein mobile POS components receive location data from a location providing system; wherein location data for said mobile PUS component is also linked to the object; and wherein said location data is also received by the server.

11. The system of claim 6 wherein the predetermined criteria comprises having performed a transaction with the mobile PUS component.

12. The system of claim 6 wherein said one or more other processors are said one or more processors; and wherein said one or more other non-transitory computer usable media are said one or more computer usable media.

* * * * *